United States Patent
Seo et al.

(10) Patent No.: US 12,051,943 B2
(45) Date of Patent: Jul. 30, 2024

(54) MOTOR

(71) Applicant: HYUNDAI MOBIS CO., LTD., Seoul (KR)

(72) Inventors: Yeong Woo Seo, Yongin-si (KR); Hye Seong Yang, Yongin-si (KR); Yong Ho Kim, Yongin-si (KR); Ui Il Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/096,747

(22) Filed: Jan. 13, 2023

(65) Prior Publication Data

US 2023/0170755 A1 Jun. 1, 2023

Related U.S. Application Data

(62) Division of application No. 17/381,576, filed on Jul. 21, 2021, now Pat. No. 11,764,631.

(30) Foreign Application Priority Data

Jul. 22, 2020 (KR) .......................... 10-2020-0091213

(51) Int. Cl.
*H02K 1/276* (2022.01)
*H02K 1/20* (2006.01)
*H02K 1/27* (2022.01)
*H02K 3/34* (2006.01)
*H02K 3/52* (2006.01)
*H02K 9/00* (2006.01)

(52) U.S. Cl.
CPC ............... *H02K 1/276* (2013.01); *H02K 1/20* (2013.01); *H02K 1/27* (2013.01); *H02K 3/34* (2013.01); *H02K 3/522* (2013.01); *H02K 9/00* (2013.01); *H02K 2203/12* (2013.01)

(58) Field of Classification Search
CPC .... H02K 1/274; H02K 3/522; H02K 2203/12; H02K 1/27; H02K 1/2706; H02K 1/272; H02K 1/2726; H02K 1/2746; H02K 1/2753; H02K 1/276; H02K 1/20; H02K 9/00
USPC .......................... 310/156.01, 156.56, 156.57
See application file for complete search history.

(56) References Cited

U.S. PATENT DOCUMENTS

| 10,630,130 B2 | 4/2020 | Suzuki et al. |
| 2008/0018190 A1* | 1/2008 | Takahata ................ H02K 1/276 310/156.55 |
| 2009/0184591 A1 | 7/2009 | Hoshino et al. |

(Continued)

FOREIGN PATENT DOCUMENTS

WO WO 2017/146117 A1 8/2017

OTHER PUBLICATIONS

United States Office Action Issued on Feb. 2, 2023, in U.S. Appl. No. 17/381,576 (14 Pages in English).

*Primary Examiner* — Alexander A Singh
(74) *Attorney, Agent, or Firm* — NSIP Law

(57) ABSTRACT

A motor includes: a stator including assemblies; and a rotor disposed on one side of the stator. Each of the assemblies includes: a bobbin; a core inserted into the bobbin; and a coil surrounding an outside of the bobbin. The bobbin includes: a main through hole into which the core is inserted; and a sub-through hole disposed in either one of a top surface and a bottom surface on one side of the main through hole. An inner space of the bobbin is communication with the outside of the bobbin through the sub-through hole.

14 Claims, 18 Drawing Sheets

(56) References Cited

U.S. PATENT DOCUMENTS

| | | |
|---|---|---|
| 2016/0241093 A1 | 8/2016 | Patel et al. |
| 2018/0175679 A1 | 6/2018 | Seo et al. |
| 2019/0214889 A1* | 7/2019 | Migita ................... H02K 1/276 |
| 2019/0348876 A1* | 11/2019 | Chiu .................... H02K 1/2746 |
| 2020/0395802 A1 | 12/2020 | Tsutsui |

* cited by examiner

MOTOR

CROSS-REFERENCE TO RELATED APPLICATIONS

This application is a divisional of U.S. application Ser. No. 17/381,576 filed on Jul. 21, 2021, which claims the benefit under 35 U.S.C. § 119(a) of Korean Patent Application No. 10-2020-0091213 filed on Jul. 22, 2020 in the Korean Intellectual Property Office, the entire disclosures of which are incorporated herein by reference for all purposes.

TECHNICAL FIELD

Exemplary embodiments relate to a motor and, more particularly, to a motor having a structure that enhances cooling performance compared to the related art.

BACKGROUND

Motors is a device including a stator and a rotor, and the stator includes a plurality of assemblies each of which is constituted by a coil, a core, and a bobbin for insulation between the coil and the core. In such a motor, a magnetic field is formed in the coil by applying current to the coil, and the rotor is rotated by an electromagnetic force.

Heat of the motor is mainly generated in a coil through which current flows and a core through which a magnetic field passes. When an excessively large amount of heat is generated in the coil and the core, the performance and durability of the motor are adversely affected. Thus, an oil for cooling is provided inside the motor.

However, according to the related art, the core and the coil have not been properly cooled by the oil.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor includes: a stator including assemblies; and a rotor disposed on one side of the stator. Each of the assemblies includes: a bobbin; a core inserted into the bobbin; and a coil surrounding an outside of the bobbin. The bobbin includes: a main through hole into which the core is inserted; and a sub-through hole disposed in either one of a top surface and a bottom surface on one side of the main through hole. An inner space of the bobbin is communication with the outside of the bobbin through the sub-through hole.

Grating structures, in which bars are arranged spaced apart from each other, may be disposed in an outer surface of the bobbin. The sub-through hole may be formed by an empty space between the bars.

The bobbin may further include a reinforcing member disposed on either one of an inner surface of the bobbin and a portion of the outer surface of the bobbin in which the bars are disposed, and extending along a direction in which the bars are arranged.

The reinforcing member may be attached to either one of the outer surface of the bobbin and the inner surface of the bobbin.

The reinforcing member may be integrally formed with the either one of the outer surface of the bobbin and the inner surface of the bobbin.

The bobbin may further include protruding members disposed on an inner surface of the bobbin and having a shape protruding to an inside of the bobbin. The sub-through hole may be formed by an empty space between the protruding members.

The protruding members may be attached to the inner surface of the bobbin.

The protruding members may be integrally formed with the inner surface of the bobbin.

In another general aspect, a motor includes: a stator; and a rotor disposed on one side of the stator. The rotor includes: a rotor body; and magnets coupled to the rotor body. The recessed portions are disposed in an outer surface of the rotor body. A concave-convex section is formed in a surface of each of the recessed portions.

The rotor may be disposed inside the stator. The outer surface of the rotor body may face an inner surface of the stator.

Each of the recessed portions may include: a first surface; and a second surface spaced apart from the first surface in a rotation direction of the rotor. The concave-convex section may be formed in the first surface and the second surface.

Each of the recessed portions may include: a first surface; and a second surface spaced apart from the first surface in a rotation direction of the rotor. The concave-convex section may be formed only in the first surface.

A size of the concave-convex section may be constant.

A size of the concave-convex section may increase toward an inside of a respective recessed portion among the recessed portions.

A size of the concave-convex section may decrease toward an inside of a respective recessed portion among the recessed portions.

A width of a recessed portion, among the recessed portions, may decrease toward an inside of the recessed portion.

A recessed portion, among the recessed portions, may include: a first recessed area having a width that decreases toward an inside of the recessed portion; and a second recessed area connected to an inner end of the first recessed area and having a section of which a width is greater than the width of the first recessed area at the inner end.

The concave-convex section may be formed in the first recessed area and the second recessed area.

A size of protrusions formed by the concave-convex section may increase toward an inside of a respective recessed portion among the recessed portions.

A size of protrusions formed by the concave-convex section may decrease toward an inside of a respective recessed portion among the recessed portions.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a structure of a motor according to the present disclosure will be described with reference to the drawings.

Motor

Figure 1:
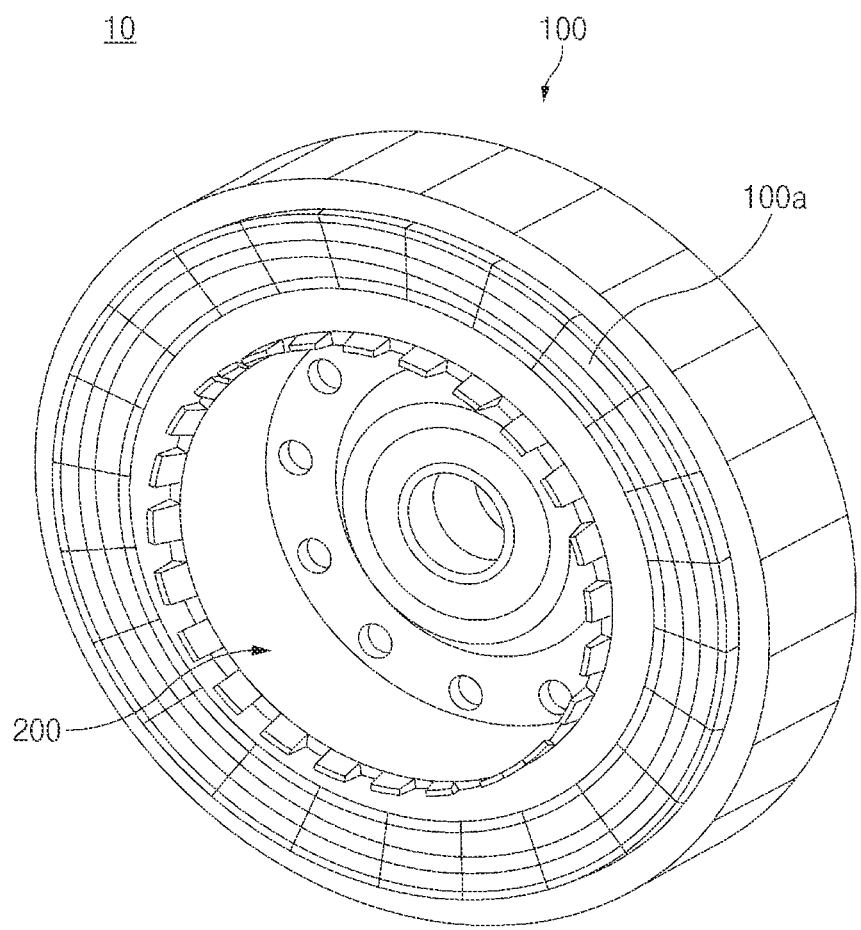
FIG. 1 is a perspective view illustrating a structure of a motor according to the present disclosure.

FIG. 1 is a perspective view illustrating a structure of a motor according to the present disclosure.

Referring to FIG. 1, a motor 10 according to the present disclosure may include: a stator 100 including a plurality of assemblies 100a; and a rotor 200 provided on one side of the stator 100. More specifically, the rotor 200 may be provided inside the stator 100. Also, as described later, an outer surface of a rotor body 210 (see FIG. 7) constituting a body of the rotor 200 may be provided facing an inner surface of the stator 100.

Figure 2:
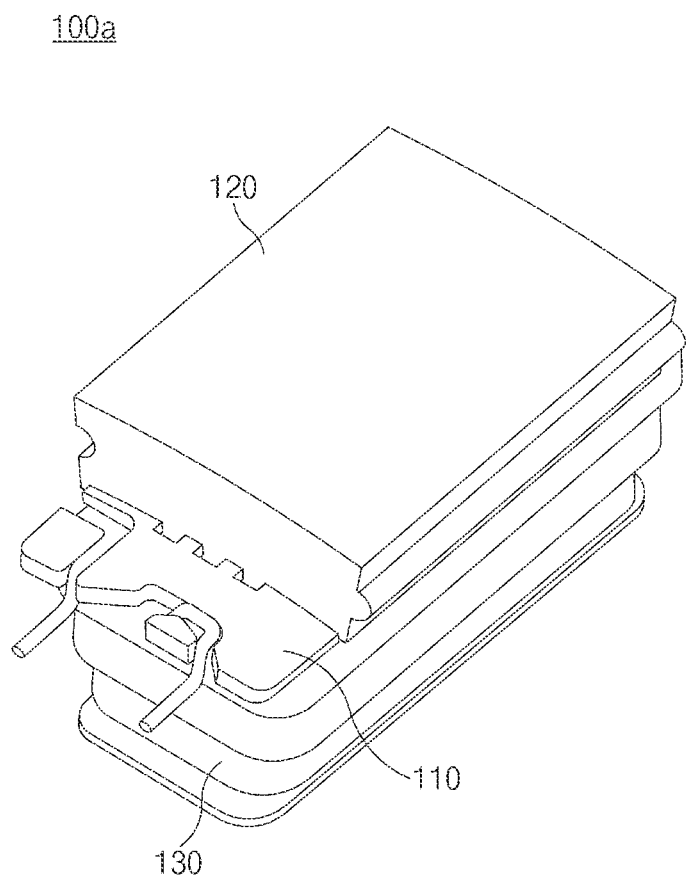
FIG. 2 is a perspective view illustrating a structure of an assembly according to the present disclosure.
Figure 3:
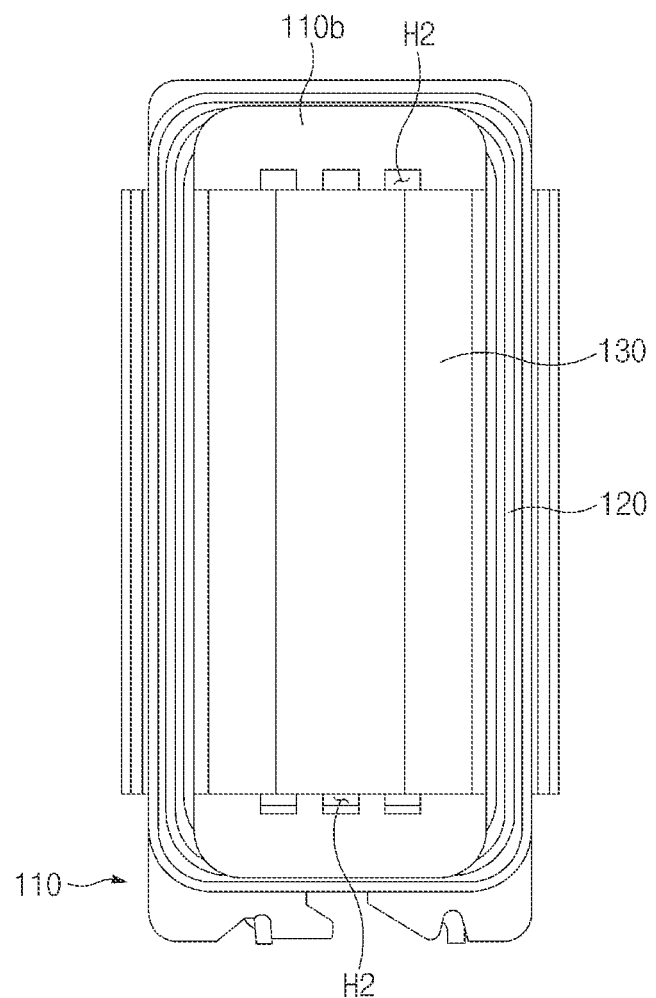
FIG. 3 is a bottom view illustrating a structure of the assembly according to the present disclosure.

FIG. 2 is a perspective view illustrating a structure of an assembly according to the present disclosure, and FIG. 3 is a bottom view illustrating a structure of the assembly according to the present disclosure.

Referring to FIGS. 2 and 3, an assembly 100a of a motor according to the present disclosure may include: a bobbin 110; a core 120 inserted into the bobbin 110; and a coil 130 provided to surround the outside of the bobbin 110. More specifically, the bobbin 110 may be a component for electrically insulating the core 120 from the coil 130.

Figure 4:
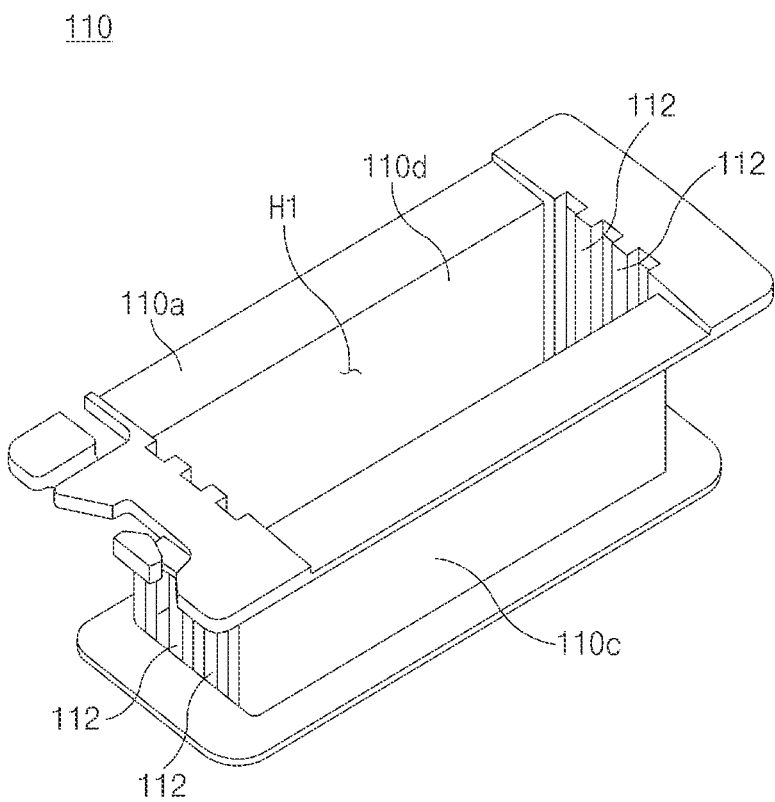
FIG. 4 is a perspective view illustrating a structure of a bobbin according to a first exemplary embodiment of the present disclosure.

FIG. 4 is a perspective view illustrating a structure of a bobbin according to a first exemplary embodiment of the present disclosure.

Referring to FIG. 4, a through-hole may be formed in the bobbin 110 provided in the motor according to the present disclosure. More specifically, a main through hole H1, which passes from a top surface 110a of the bobbin 110 to a bottom surface 110b of the bobbin 110 (see FIG. 3), may be formed in the bobbin 110. Here, the core 120 may be inserted into the main through hole H1 (see FIG. 3).

Also, in addition to the main through hole H1, another through-hole may be additionally formed in the bobbin 110. More specifically, according to the first exemplary embodiment of the present disclosure, a sub-through hole H2 may be additionally formed, which is provided in the top surface 110a or the bottom surface 110b of the bobbin 110 and provided on one side of the main through hole H1. Here, a size of the sub-through hole H2 may be less than a size of the main through hole H1. Also, a plurality of sub-through holes H2 may be provided. FIG. 3 illustrates, as an example, a state in which six sub-through holes H2 are formed in the bottom surface 110b of the bobbin 110. More preferably, similar to the main through hole H1, the sub-through hole H2 may pass from the top surface 110a of the bobbin 110 to the bottom surface 110b.

Also, referring to FIGS. 3 and 4, an inner space of the bobbin 110 may be formed by the main through hole H1 and the sub-through hole H2. Here, the sub-through hole H2 may communicate with the main through hole H1. Also, as described above, the core 120 may be inserted into the main through hole H1. Thus, according to the present disclosure, the inner space of the bobbin 110 may communicate with the outside of the bobbin 110 through the sub-through hole H2, and an area of the core 120 provided in the main through hole H1 of the bobbin 110 may also communicate with the outside of the bobbin 110 through the sub-through hole H2.

According to the present disclosure, since the inner space of the bobbin 110 communicates with the outside of the bobbin 110 through the sub-through hole H2, a cooling oil may flow, through the sub-through hole H2, into the inner space of the bobbin 110, particularly, into an area of the core 120 provided in the main through hole H1. Thus, since an oil may be smoothly supplied to the coil and the core which generate a large amount of heat in the motor, the cooling efficiency with respect to the motor may be enhanced compared to the related art.

Continuing to refer to FIG. 4, a plurality of bars 112 extending in the up-down direction may be provided in at least some of outer surfaces 110c of the bobbin 110 according to the first exemplary embodiment of the present disclosure. Also, at least some of the outer surfaces 110c of the bobbin 110 may have a grating structure by the plurality of bars 112 arranged spaced apart from each other in the left-right direction. Thus, according to the first exemplary embodiment of the present disclosure, empty spaces may be formed between the plurality of bars 112. FIG. 4 illustrates the grating structure in which, as the plurality of bars 112 are provided in each of two narrow outer surfaces among the outer surfaces 110c of the bobbin 110, three empty spaces are formed in each of the two relatively narrow outer surfaces.

Here, according to the present disclosure, the sub-through holes H2 may be formed by the above-described empty spaces formed between the plurality of bars 112. Thus, the number of the empty spaces formed between the plurality of bars 112 may be equal to the number of the sub-through holes H2. That is, according to the first exemplary embodiment of the present disclosure, the plurality of bars 112 provided in some of the outer surfaces 110c of the bobbin 110 may be components for forming the sub-through holes H2. Also, the plurality of bars 112 may play a role in securing rigidity of the outer surfaces 110c of the bobbin 110.

Figure 5:
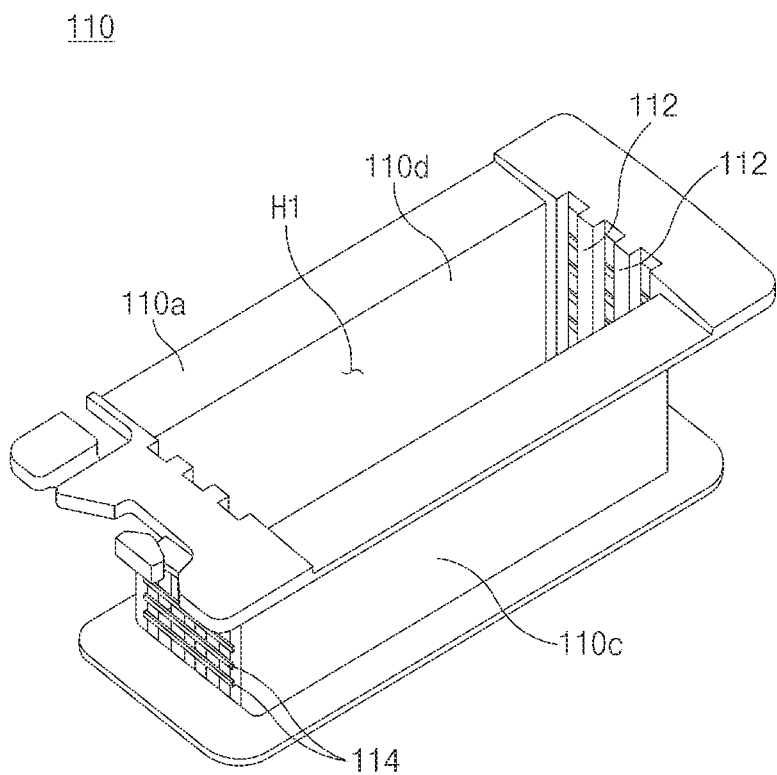
FIG. 5 is a perspective view illustrating a structure of a bobbin according to a second exemplary embodiment of the present disclosure.

FIG. 5 is a perspective view illustrating a structure of a bobbin according to a second exemplary embodiment of the present disclosure. Hereinafter, the second exemplary embodiment of the present disclosure will be described mainly with respect to differences from the first exemplary embodiment. Within a range not contradicting features to be described below, the features described above with respect to the first exemplary embodiment of the present disclosure may be applied as they are to the second exemplary embodiment of the present disclosure.

Similar to the first exemplary embodiment of the present disclosure, a main through hole H1 and sub-through holes H2 (see FIG. 3) may also be formed in a bobbin 110 of a motor according to the second exemplary embodiment of the present disclosure. Also, grating structures by a plurality of bars 112 may be provided on outer surfaces 110c of the bobbin 110.

However, according to the second exemplary embodiment of the present disclosure unlike the first exemplary embodiment of the present disclosure, the bobbin 110 may further include a reinforcing member 114, which is provided on an inner surface 110d or the outer surface 110c of the bobbin 110 in which the plurality of bars 112 are provided and extends along a direction (that is, the left-right direction) in which the plurality of bars 112 are arranged. Thus, the reinforcing member 114 may be provided crossing the plurality of bars 112. Also, a plurality of reinforcing members 114 may be provided. Here, FIG. 5 illustrates, as an example, a state in which the reinforcing members 114 are provided on the outer surfaces 110c of the bobbin 110, but the reinforcing members 114 may be provided on the inner surface 110d of the bobbin 110.

Also, according to the second exemplary embodiment of the present disclosure, the reinforcing members 114 may be components provided separably on the outer surface 110c or the inner surface 110d of the bobbin 110. That is, the reinforcing members 114 may be components attached separably to the outer surface 110c or the inner surface 110d of the bobbin 110. Unlike the above, however, the reinforcing members 114 may be components provided integrally with the outer surface 110c or the inner surface 110d of the bobbin 110.

In the second exemplary embodiment of the present disclosure when compared to the first exemplary embodiment of the present disclosure, the bobbin 110 further includes the reinforcing member 114, and thus, the rigidity of the bobbin 110 may be further enhanced.

Figure 6:
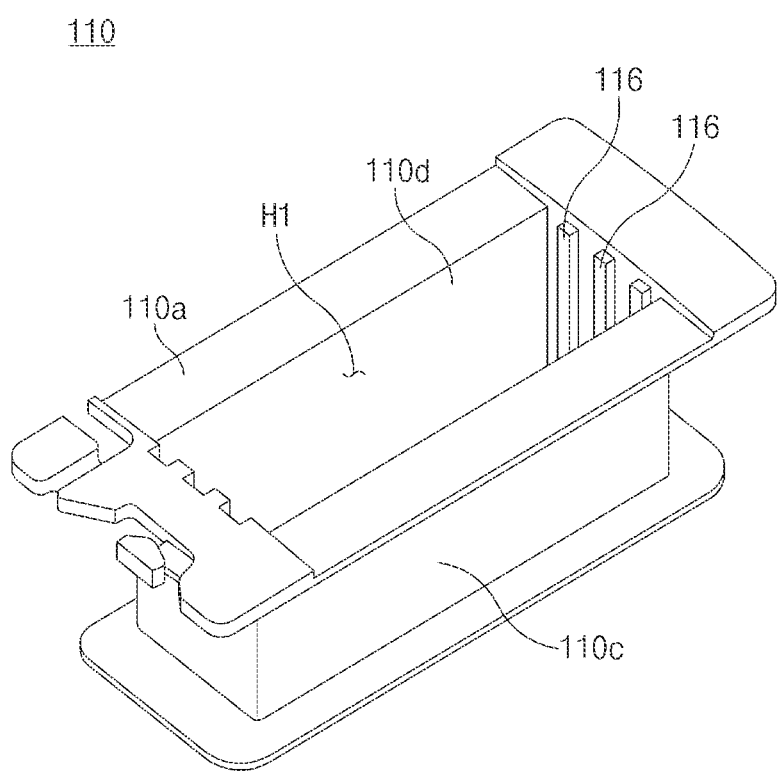
FIG. 6 is a perspective view illustrating a structure of a bobbin according to a third exemplary embodiment of the present disclosure.

FIG. 6 is a perspective view illustrating a structure of a bobbin according to a third exemplary embodiment of the present disclosure. Hereinafter, the third exemplary embodiment of the present disclosure will be described mainly with respect to differences from the first exemplary embodiment and the second exemplary embodiment of the present disclosure. Within a range not contradicting features to be described below, the features described above with respect to the first exemplary embodiment and the second exemplary embodiment of the present disclosure may be applied as they are to the third exemplary embodiment of the present disclosure.

Similar to the first exemplary embodiment and the second exemplary embodiment of the present disclosure, a main through hole H1 and sub-through holes H2 (see FIG. 3) may also be formed in a bobbin 110 of a motor according to the third exemplary embodiment of the present disclosure. However, according to the third exemplary embodiment of the present disclosure, a grating structure by a plurality of bars may not be formed on an outer surface 110c or an inner surface 110d of the bobbin 110.

That is, according to the third exemplary embodiment of the present disclosure, the bobbin 110 may further include a protruding member 116 which is provided on the inner surface 110d of the bobbin 110 and has a shape protruding to the inside of the bobbin 110, that is, toward the main through hole H1. A plurality of protruding members 116 may be provided and spaced apart from each other in the left-right direction as illustrated in FIG. 6. Here, according to the third exemplary embodiment of the present disclosure, the sub-through holes H2 (see FIG. 3) may be formed by empty spaces formed between the plurality of protruding members 116.

Also, according to the third exemplary embodiment of the present disclosure, the protruding members 116 may be components provided separably on the inner surface 110d of the bobbin 110. That is, the protruding members 116 may be components attached separably to the inner surface 110d of the bobbin 110. Unlike the above, however, the protruding members 116 may be components provided integrally with the inner surface 110d of the bobbin 110.

In the third exemplary embodiment of the present disclosure when compared to the first exemplary embodiment and the second exemplary embodiment of the present disclosure, empty spaces for forming the sub-through holes H are not formed in the outer surface 110c of the bobbin 110, and thus, the rigidity of the bobbin 110 may be further enhanced.

Figure 7:
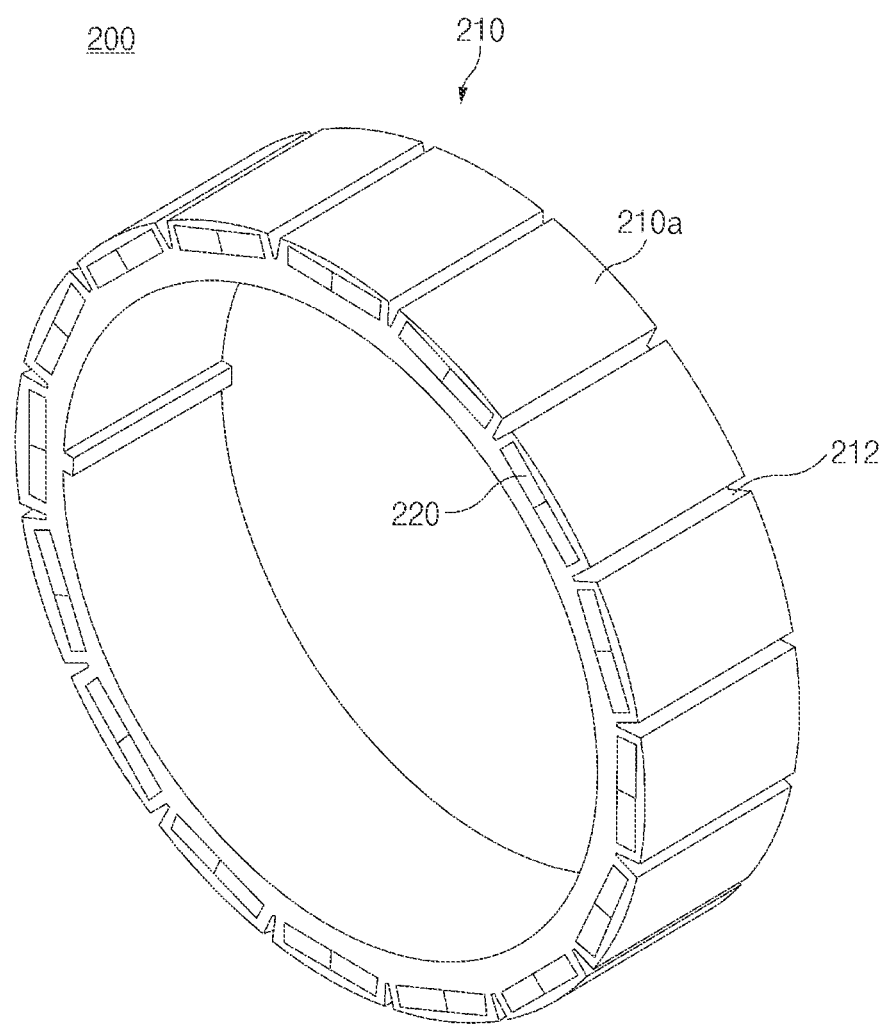
FIG. 7 is a perspective view illustrating a structure of a rotor according to the present disclosure.

FIG. 7 is a perspective view illustrating a structure of a rotor according to the present disclosure.

As illustrated in FIG. 7, a rotor 200 of the motor according to the present disclosure may include: a rotor body 210 forming a body of the rotor 200; and a plurality of magnets 220 coupled to the rotor body 210. Here, the magnets 220 may be permanent magnets, but the types of magnets are limited thereto. For example, the plurality of magnets 220 may be inserted into the rotor body 210.

Also, in an outer surface 210a of the rotor body 210, a plurality of recessed portions 212, which have a shape recessed inward from the other area of the rotor body 210, may be provided. For example, the plurality of recessed portions 212 may be provided at equal intervals along the circumferential direction of the rotor 200.

Figure 8:
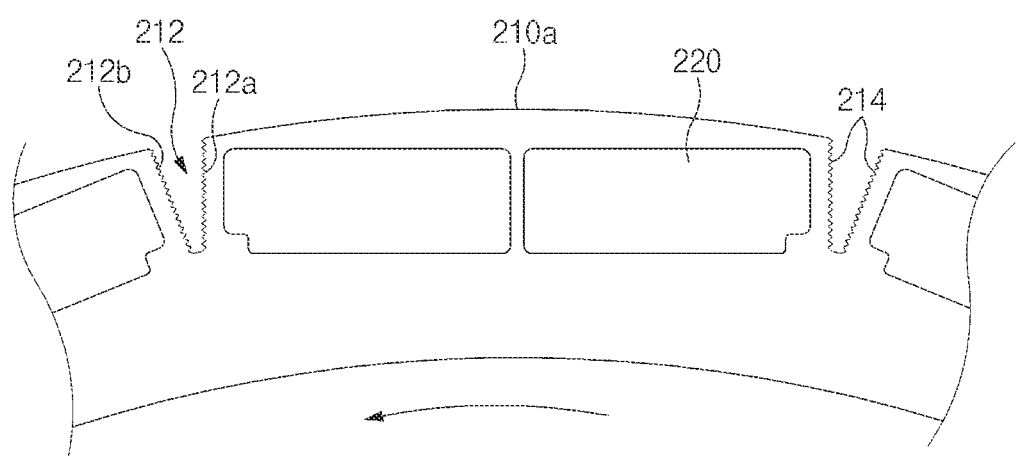
FIG. 8 is a cross-sectional view illustrating a structure of a rotor according to a fourth exemplary embodiment of the present disclosure.
Figure 9:
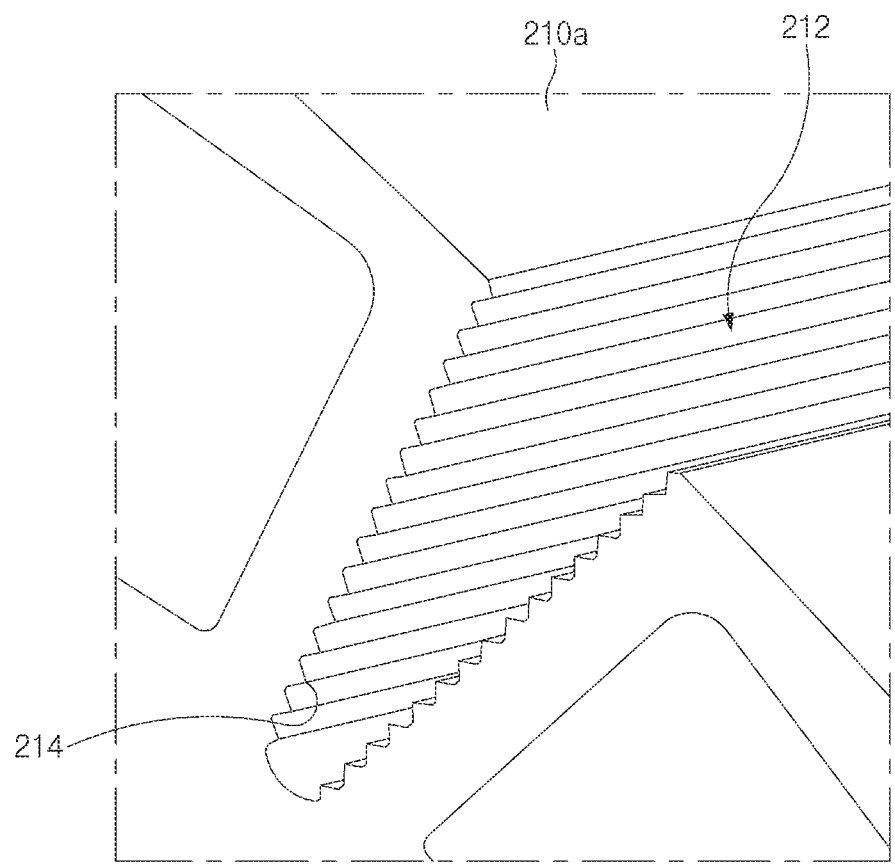
FIG. 9 is an enlarged perspective view illustrating a recessed portion of the rotor according to the fourth exemplary embodiment of the present disclosure.
Figure 10:
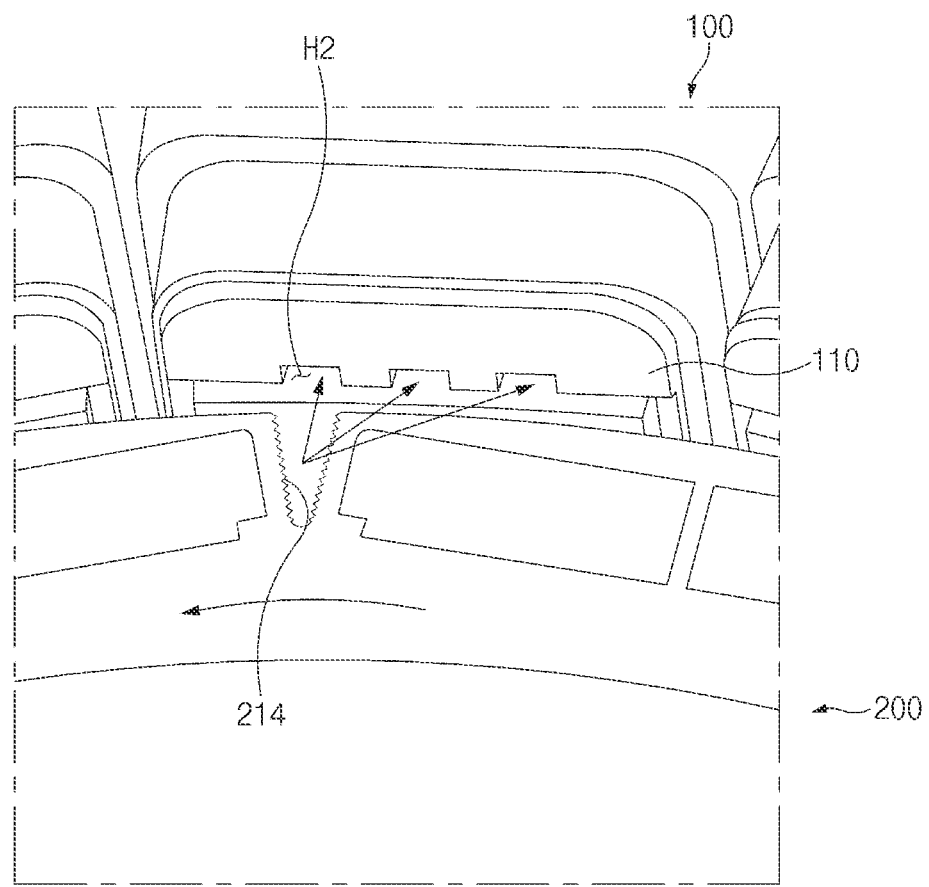
FIG. 10 is a perspective view illustrating a path of an oil due to rotation of the rotor when the motor according to the present disclosure is operated.

FIG. 8 is a cross-sectional view illustrating a structure of a rotor according to a fourth exemplary embodiment of the present disclosure, and FIG. 9 is an enlarged perspective view illustrating a recessed portion of the rotor according to the fourth exemplary embodiment of the present disclosure. Also, FIG. 10 is a perspective view illustrating a path of an oil due to rotation of the rotor when the motor according to the present disclosure is operated.

As illustrated in FIGS. 8 and 9, according to the present disclosure, a fine concave-convex section 214 having an uneven concave-convex shape may be formed in a surface of each of the recessed portions 212.

According to the present disclosure, the recessed portion 212 may be a space in which an oil for cooling the motor is temporarily stored, and the fine concave-convex section 214 may be a component for effectively spraying the oil stored in the recessed portion 212 onto the outside of the rotor 200 during rotation of the rotor 200. That is, surface roughness of the recessed portion 212 in an area having the fine concave-convex section 214 becomes increased, and thus, it is possible to prevent the oil from slipping on the surface of the recessed portion 212. In this case, torque of the rotor 200 may be effectively transmitted to the oil present on the fine concave-convex section 214, and accordingly, the oil present on the fine concave-convex section 214 may be sprayed at high speed onto the outside of the rotor 200. FIG. 10 illustrates a state in which, by the rotation of the rotor 200, the oil present on the fine concave-convex section 214 formed in the surface of the recessed portion 212 is sprayed onto the outside of the rotor 200, particularly, toward sub-through holes H2 formed in a bobbin 110.

Also, as illustrated in FIG. 8, according to the present disclosure, each of the recessed portions 212 may include: a first surface 212a; and a second surface 212b spaced apart from the first surface 212a in a rotation direction (see an arrow in FIG. 8) of the rotor 200. Here, fine concave-convex sections 214 may be formed in all of the first surface 212a and the second surface 212b. For example, the fine concave-convex sections 214 may be formed in the entire area of the first surface 212a and the entire area of the second surface 212b. Also, as illustrated in FIGS. 8 and 9, according to the fourth exemplary embodiment of the present disclosure, a size of the fine concave-convex section 214 may be constant over the entire area in which the fine concave-convex section 214 is formed. Here, the size of the fine concave-convex section 214 may be defined, for example, as a height between the highest protruding area and the deepest recessed area in the fine concave-convex section 214, a distance between the height protruding areas in the fine concave-convex section 214, or a distance between the deepest recessed areas.

Figure 11:
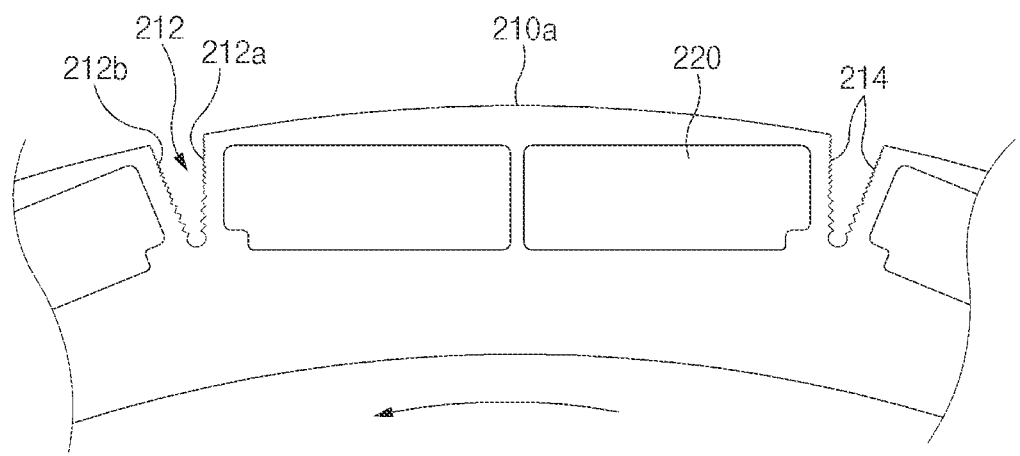
FIG. 11 is a cross-sectional view illustrating a structure of a rotor according to a fifth exemplary embodiment of the present disclosure.
Figure 12:
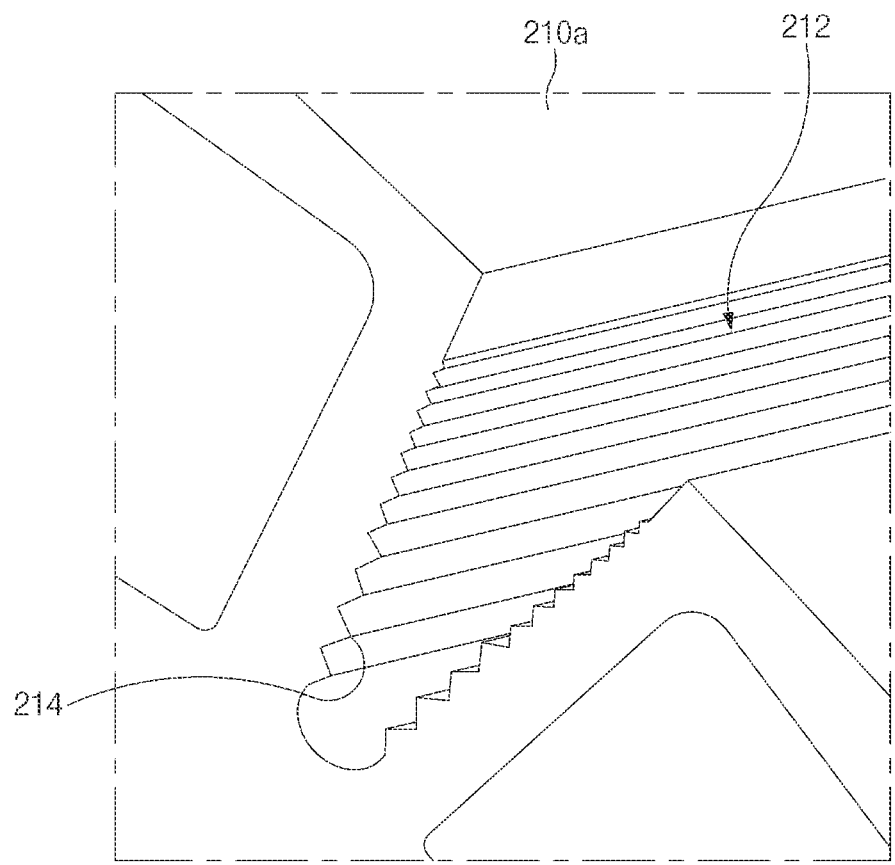
FIG. 12 is an enlarged perspective view illustrating a recessed portion of the rotor according to the fifth exemplary embodiment of the present disclosure.

FIG. 11 is a cross-sectional view illustrating a structure of a rotor according to a fifth exemplary embodiment of the present disclosure, and FIG. 12 is an enlarged perspective view illustrating a recessed portion of the rotor according to the fifth exemplary embodiment of the present disclosure. Hereinafter, a structure of the fifth exemplary embodiment of the present disclosure will be described mainly with respect to differences when compared to the fourth exemplary embodiment of the present disclosure.

According to the fifth exemplary embodiment of the present disclosure unlike the fourth exemplary embodiment of the present disclosure, a size of a fine concave-convex section 214 may increase toward the inside of a recessed portion 212 as illustrated in FIGS. 11 and 12. Even in this case, however, similar to the fourth exemplary embodiment of the present disclosure, fine concave-convex sections 214 may be formed in all of a first surface 212a and a second surface 212b, and the fine concave-convex sections 214 may be formed in the entire area of the first surface 212a and the entire area of the second surface 212b.

Figure 13:
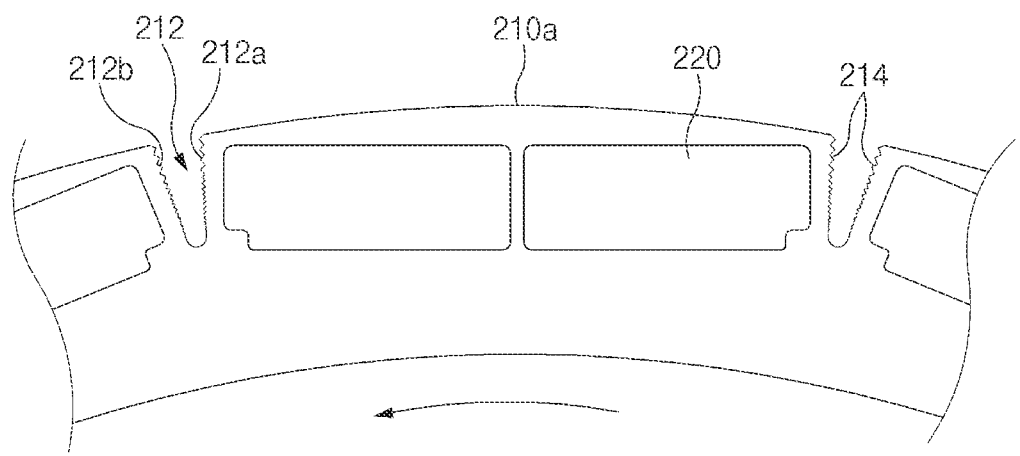
FIG. 13 is a cross-sectional view illustrating a structure of a rotor according to a sixth exemplary embodiment of the present disclosure.
Figure 14:
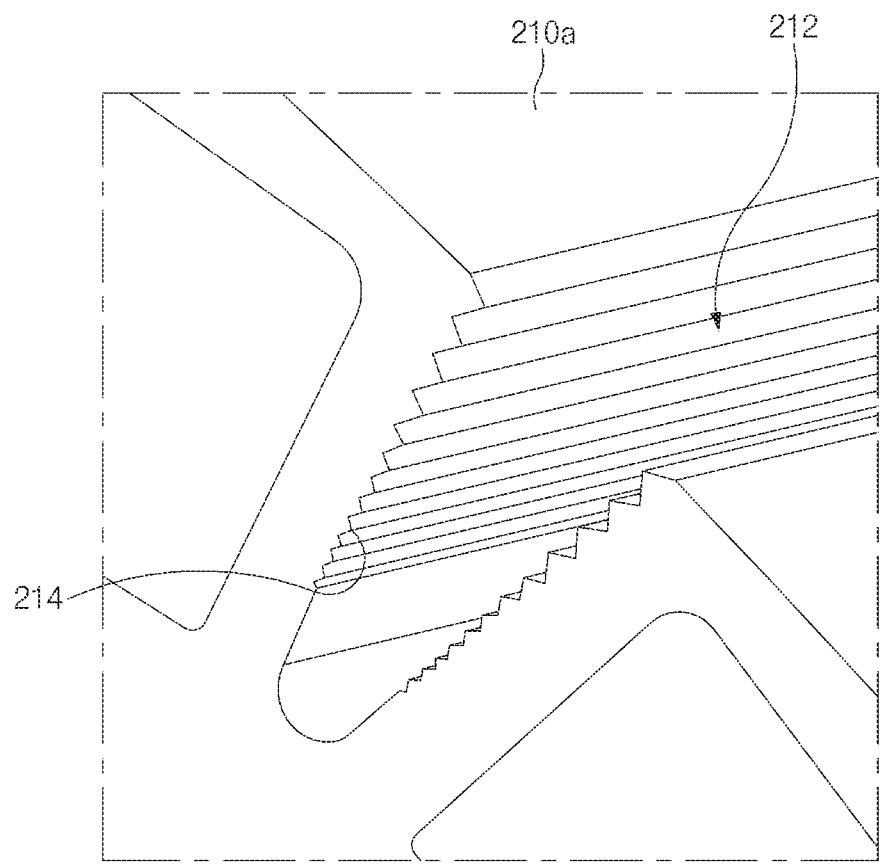
FIG. 14 is an enlarged perspective view illustrating a recessed portion of the rotor according to the sixth exemplary embodiment of the present disclosure.

FIG. 13 is a cross-sectional view illustrating a structure of a rotor according to a sixth exemplary embodiment of the present disclosure, and FIG. 14 is an enlarged perspective view illustrating a recessed portion of the rotor according to the sixth exemplary embodiment of the present disclosure. Hereinafter, a structure of the sixth exemplary embodiment of the present disclosure will be described mainly with respect to differences when compared to the fourth exemplary embodiment and the fifth exemplary embodiment of the present disclosure.

According to the sixth exemplary embodiment of the present disclosure unlike the fourth exemplary embodiment and the fifth exemplary embodiment of the present disclosure, a size of a fine concave-convex section 214 may decrease toward the inside of a recessed portion 212 as illustrated in FIGS. 13 and 14. Even in this case, however, similar to the fourth exemplary embodiment and the fifth exemplary embodiment of the present disclosure, fine concave-convex sections 214 may be formed in all of a first surface 212a and a second surface 212b, and the fine concave-convex sections 214 may be formed in the entire area of the first surface 212a and the entire area of the second surface 212b.

Here, referring to FIGS. 8, 9, 11, 12, 13, and 14, a width of the recessed portion 212 in the rotation direction of the rotor 200 may decrease toward the inside of the recessed portion 212. In this case, a relatively large amount of oil may be stored toward the outside of the recessed portion 212, and a relatively small amount of oil may be stored toward the inside of the recessed portion 212. Thus, it is possible to minimize an oil which remains inside the recessed portion 212 and does not contribute to cooling the motor.

Figure 15:
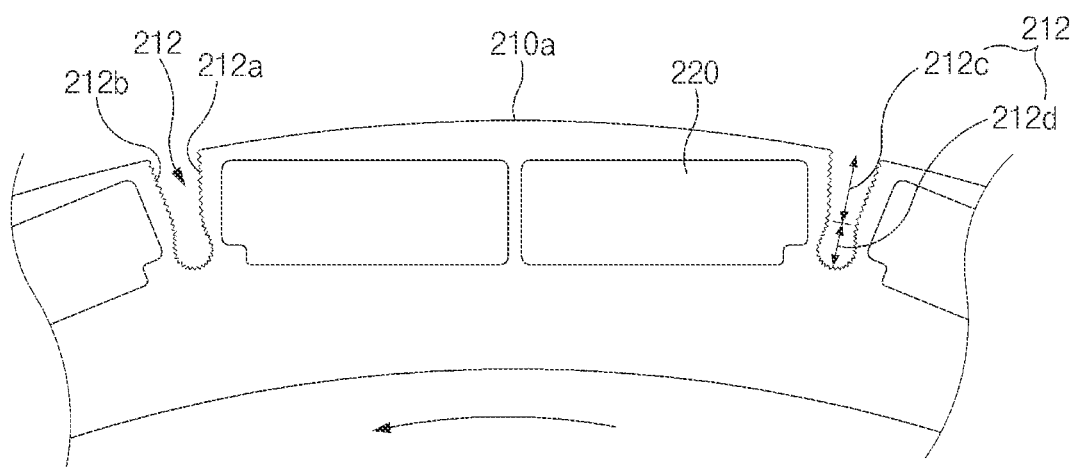
FIG. 15 is a cross-sectional view illustrating a structure of a rotor according to a seventh exemplary embodiment of the present disclosure.
Figure 16:
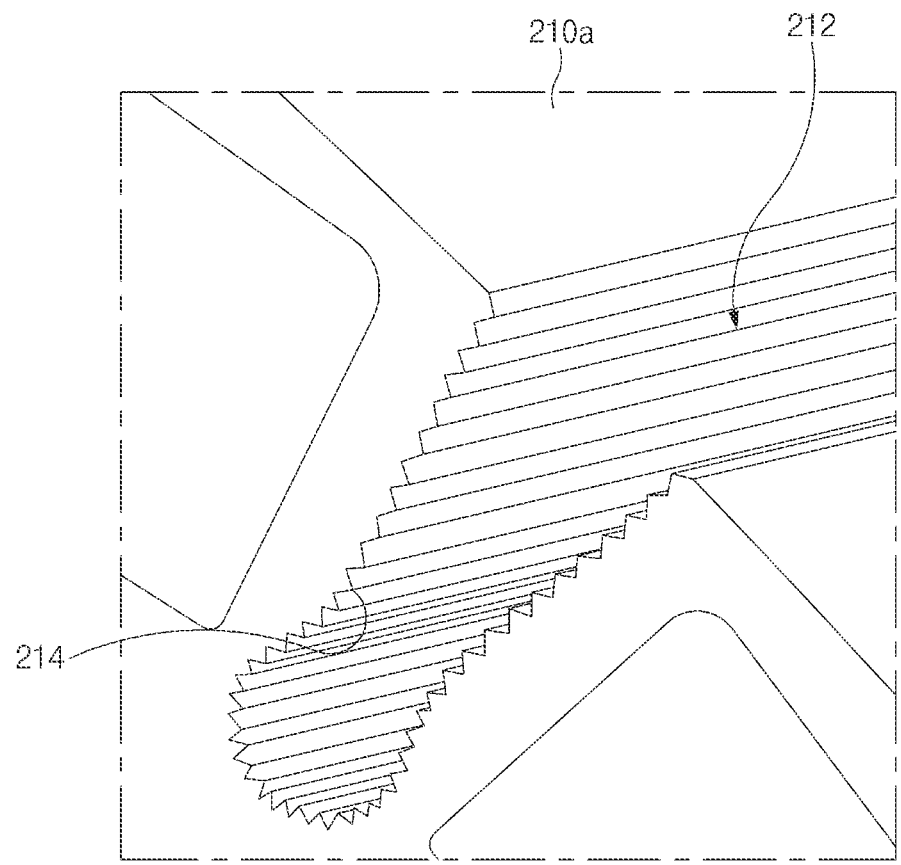
FIG. 16 is an enlarged perspective view illustrating a recessed portion of the rotor according to the seventh exemplary embodiment of the present disclosure.

FIG. 15 is a cross-sectional view illustrating a structure of a rotor according to a seventh exemplary embodiment of the present disclosure, and FIG. 16 is an enlarged perspective view illustrating a recessed portion of the rotor according to the seventh exemplary embodiment of the present disclosure. Hereinafter, a structure of the seventh exemplary embodiment of the present disclosure will be described mainly with respect to differences when compared to the fourth to sixth exemplary embodiments of the present disclosure.

According to the seventh exemplary embodiment of the present disclosure unlike the fourth to sixth exemplary embodiments of the present disclosure, not only an area in which a width of a recessed portion 212 decreases toward the inside of the recessed portion 212 but also an area in which the width of the recessed portion 212 increases toward the inside of the recessed portion 212 may be present in the recessed portion 212. More specifically, the recessed portion 212 may include: a first recessed area 212c having a width that decreases toward the inside of the recessed portion 212; and a second recessed area 212d connected to an inner end of the first recessed area 212c and having a section of which a width is greater than the width of the first recessed area 212c at the inner end. In this case, a large amount of oil for cooling the motor may be stored within the recessed portion 212 when compared to the fourth to sixth exemplary embodiments of the present disclosure. Also, in this case, fine concave-convex sections 214 may be formed in all of the first recessed area 212c and the second recessed area 212d and also may be formed in all of a first surface 212a and a second surface 212b.

Figure 17:
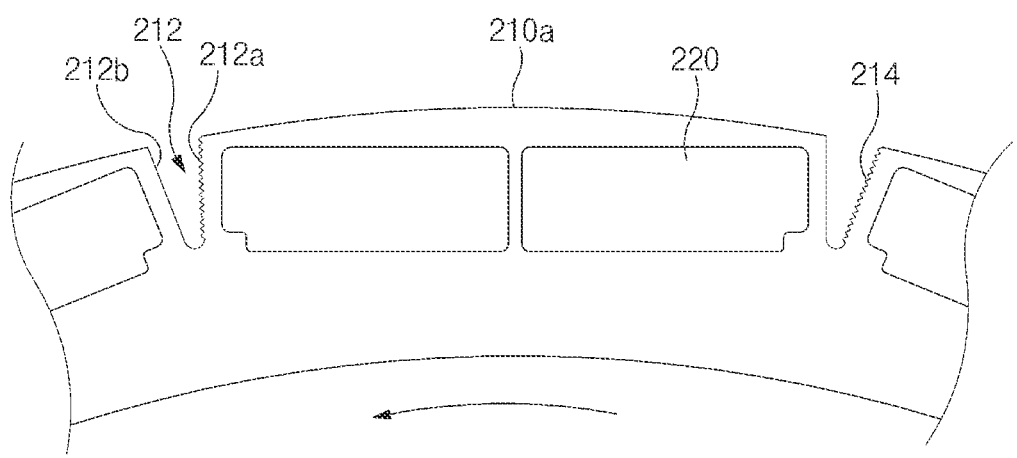
FIG. 17 is a cross-sectional view illustrating a structure of a rotor according to an eighth exemplary embodiment of the present disclosure.
Figure 18:
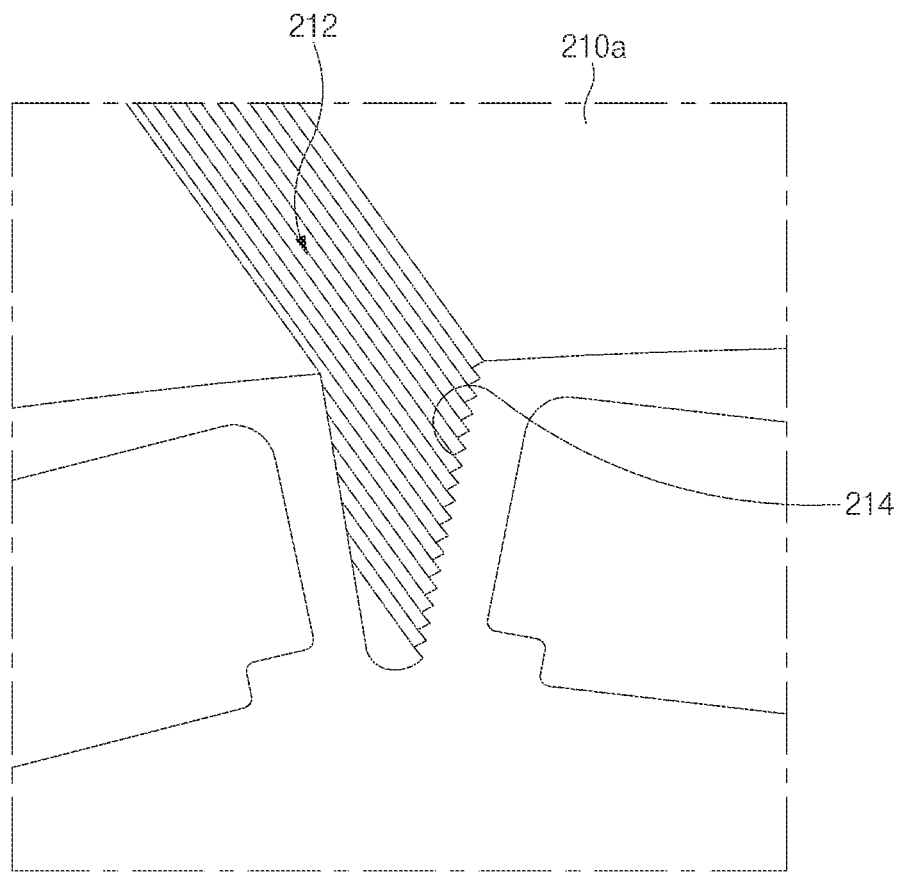
FIG. 18 is an enlarged perspective view illustrating a recessed portion of the rotor according to the eighth exemplary embodiment of the present disclosure.

FIG. 17 is a cross-sectional view illustrating a structure of a rotor according to an eighth exemplary embodiment of the present disclosure, and FIG. 18 is an enlarged perspective view illustrating a recessed portion of the rotor according to the eighth exemplary embodiment of the present disclosure. Hereinafter, a structure of the eighth exemplary embodiment of the present disclosure will be described mainly with respect to differences when compared to the fourth to seventh exemplary embodiments of the present disclosure.

According to the eighth exemplary embodiment of the present disclosure unlike the fourth to seventh exemplary embodiments of the present disclosure, a fine concave-convex section 214 may be formed in only one of a first surface 212a or a second surface 212b. More specifically, the fine concave-convex section 214 may be formed only in the first surface 212a.

Due to inertia when a rotor 200 rotates, a larger amount of oil may come into contact with the first surface 212a than the second surface 212b within a recessed portion 212. Thus, a larger amount of oil may be sprayed outward in the vicinity of the first surface 212a than in the vicinity of the second surface 212b. Thus, even though the fine concave-convex section 214 is formed only in the first surface 212a, the objects of the present disclosure (to prevent slipping of oil on the recessed portion and to spray the oil) may be smoothly achieved by the formation of fine concave-convex section. Also, it is possible to minimize an additional process for forming the fine concave-convex section 214.

According to the present disclosure, the cooling performance with respect to the core and coil of the motor may be enhanced as compared to the related art.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A motor, comprising:
   a stator including a plurality of bobbins; and
   a rotor disposed on one side of the stator,
   wherein the rotor comprises:
     a rotor body;
     magnets coupled to the rotor body;
     recessed portions disposed in an outer surface of the rotor body; and
     a concave-convex section formed in at least one surface of each of the recessed portions, the concave-convex section including a ridged portion, and
   wherein the ridged portion is configured to spray oil accumulated thereon toward the bobbins when the rotor is rotated.

2. The motor of claim 1,
   wherein the rotor is disposed inside the stator, and
   wherein the outer surface of the rotor body faces an inner surface of the stator.

3. The motor of claim 2,
   wherein each of the recessed portions comprises:
     a first surface; and
     a second surface spaced apart from the first surface in a rotation direction of the rotor, and
   wherein the concave-convex section is formed in the first surface and the second surface.

4. The motor of claim 2,
   wherein each of the recessed portions comprises:
     a first surface; and
     a second surface spaced apart from the first surface in a rotation direction of the rotor, and
   wherein the concave-convex section is formed only in the first surface.

5. The motor of claim 2, wherein a size of the concave-convex section is constant.

6. The motor of claim 2, wherein a size of the concave-convex section increases toward an inside of a respective recessed portion among the recessed portions.

7. The motor of claim 2, wherein a size of the concave-convex section decreases toward an inside of a respective recessed portion among the recessed portions.

8. The motor of claim 2, wherein a width of a recessed portion, among the recessed portions, decreases toward an inside of the recessed portion.

9. The motor of claim 2, wherein a recessed portion, among the recessed portions, comprises:
   a first recessed area having a width that decreases toward an inside of the recessed portion; and
   a second recessed area connected to an inner end of the first recessed area and having a section of which a width is greater than the width of the first recessed area at the inner end.

10. The motor of claim 9, wherein the concave-convex section is formed in the first recessed area and the second recessed area.

11. The motor of claim 2, wherein a size of protrusions formed by the concave-convex section increases toward an inside of a respective recessed portion among the recessed portions.

12. The motor of claim 2, wherein a size of protrusions formed by the concave-convex section decreases toward an inside of a respective recessed portion among the recessed portions.

13. A motor, comprising:
    a stator; and
    a rotor disposed on one side of the stator,
    wherein the rotor comprises:
      a rotor body; and
      magnets coupled to the rotor body,
    wherein recessed portions are disposed in an outer surface of the rotor body,
    wherein a concave-convex section is formed in a surface of each of the recessed portions, and
    wherein a size of protrusions formed by the concave-convex section increases toward an inside of a respective recessed portion among the recessed portions.

14. A motor, comprising:
    a stator; and
    a rotor disposed on one side of the stator,
    wherein the rotor comprises:
      a rotor body; and
      magnets coupled to the rotor body,
    wherein recessed portions are disposed in an outer surface of the rotor body,
    wherein a concave-convex section is formed in a surface of each of the recessed portions, and
    wherein a size of protrusions formed by the concave-convex section decreases toward an inside of a respective recessed portion among the recessed portions.

* * * * *